(12) United States Patent
Fullerton et al.

(10) Patent No.: US 7,817,003 B2
(45) Date of Patent: Oct. 19, 2010

(54) DEVICE AND METHOD FOR ENABLING A COVER TO BE ATTACHED TO AND REMOVED FROM A COMPARTMENT WITHIN THE DEVICE

(75) Inventors: Larry W. Fullerton, New Hope, AL (US); Mark D. Roberts, Huntsville, AL (US)

(73) Assignee: Cedar Ridge Research, LLC., New Hope, AL (US)

( * ) Notice: Subject to any disclaimer, the term of this patent is extended or adjusted under 35 U.S.C. 154(b) by 0 days.

(21) Appl. No.: 12/479,823

(22) Filed: Jun. 7, 2009

(65) Prior Publication Data

US 2009/0289063 A1 Nov. 26, 2009

Related U.S. Application Data

(63) Continuation-in-part of application No. 12/476,952, filed on Jun. 2, 2009, which is a continuation-in-part of application No. 12/322,561, filed on Feb. 4, 2009, which is a continuation-in-part of application No. 12/358,423, filed on Jan. 23, 2009, which is a continuation-in-part of application No. 12/123,718, filed on May 20, 2008.

(51) Int. Cl.
  *H01F 7/02* (2006.01)
  *H01F 7/20* (2006.01)
  *B65D 51/00* (2006.01)
(52) U.S. Cl. .................. 335/306; 335/285; 220/230
(58) Field of Classification Search .............. 335/285, 335/302–306; 24/303; 2/102–103, 312, 2/315, 319, 321, 322, 338, 422, 462, 913; 220/230
See application file for complete search history.

(56) References Cited

U.S. PATENT DOCUMENTS

| | | | |
|---|---|---|---|
| 381,968 | A | 5/1888 | Tesla |
| 493,858 | A | 3/1893 | Edison |
| 996,933 | A | 7/1911 | Lindquist |
| 1,236,234 | A | 8/1917 | Troje |
| 2,389,298 | A | 11/1945 | Ellis |

(Continued)

FOREIGN PATENT DOCUMENTS

FR 823395 1/1938

(Continued)

OTHER PUBLICATIONS

"BNS Series-Compatible Series AES Safety Controllers" pp. 1-17, http://www.schmersalusa.com/safety_controllers/drawings/aes.pdf (downloaded on or before Jan. 23, 2009).

(Continued)

*Primary Examiner*—Ramon M Barrera
(74) *Attorney, Agent, or Firm*—William J. Tucker

(57) ABSTRACT

A device is described herein that incorporates correlated magnets which enable a cover to be easily and effectively attached to and removed from a compartment. Some examples of such a device include a remote control unit, a calculator, a clock-radio, a mobile phone, a laptop computer, a personal digital assistant (PDA), a camera, a television, a portable media player, and a handheld electronic game unit.

20 Claims, 21 Drawing Sheets

U.S. PATENT DOCUMENTS

| | | | |
|---|---|---|---|
| 2,570,625 | A | 10/1951 | Zimmerman et al. |
| 2,722,617 | A | 11/1955 | Cluwen et al. |
| 2,932,545 | A | 4/1960 | Foley |
| 3,102,314 | A | 9/1963 | Alderfer |
| 3,208,296 | A | 9/1965 | Baermann |
| 3,288,511 | A | 11/1966 | Tavano |
| 3,468,576 | A | 9/1969 | Beyer et al. |
| 3,474,366 | A | 10/1969 | Barney |
| 3,802,034 | A | 4/1974 | Bookless |
| 4,079,558 | A | 3/1978 | Gorham |
| 4,222,489 | A | 9/1980 | Hutter |
| 4,453,294 | A | 6/1984 | Morita |
| 4,547,756 | A | 10/1985 | Miller et al. |
| 4,629,131 | A | 12/1986 | Podell |
| 4,941,236 | A | 7/1990 | Sherman |
| 5,050,276 | A | 9/1991 | Pemberton |
| 5,367,891 | A | 11/1994 | Furuyama |
| 5,383,049 | A | 1/1995 | Carr |
| 5,631,093 | A | 5/1997 | Perry et al. |
| 5,631,618 | A | 5/1997 | Trumper et al. |
| 6,072,251 | A | 6/2000 | Markle |
| 6,170,131 | B1 | 1/2001 | Shin |
| 6,275,778 | B1 | 8/2001 | Shimada et al. |
| 6,457,179 | B1 | 10/2002 | Prendergast |
| 6,607,304 | B1 | 8/2003 | Lake et al. |
| 6,720,698 | B2 | 4/2004 | Galbraith |
| 6,847,134 | B2 | 1/2005 | Frissen et al. |
| 6,862,748 | B2 | 3/2005 | Prendergast |
| 6,927,657 | B1 | 8/2005 | Wu |
| 6,971,147 | B2 | 12/2005 | Haltstead |
| 7,066,778 | B2 | 6/2006 | Kretzschmar |
| 7,362,018 | B1 | 4/2008 | Kulogo et al. |
| 7,444,683 | B2 | 11/2008 | Prendergast et al. |
| 7,490,361 | B1 * | 2/2009 | Floyd ............................ 2/94 |
| 2004/0003487 | A1 | 1/2004 | Reiter |
| 2006/0066428 | A1 | 3/2006 | McCarthy et al. |
| 2006/0189259 | A1 | 8/2006 | Park |
| 2006/0290451 | A1 | 12/2006 | Prendergast et al. |
| 2008/0186683 | A1 | 8/2008 | Ligtenberg et al. |
| 2008/0272868 | A1 | 11/2008 | Prendergast et al. |
| 2008/0282517 | A1 | 11/2008 | Claro |

FOREIGN PATENT DOCUMENTS

WO     2007081830 A2     7/2007

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns.333.pdf (downloaded on or before Jan. 23, 2009).

* cited by examiner

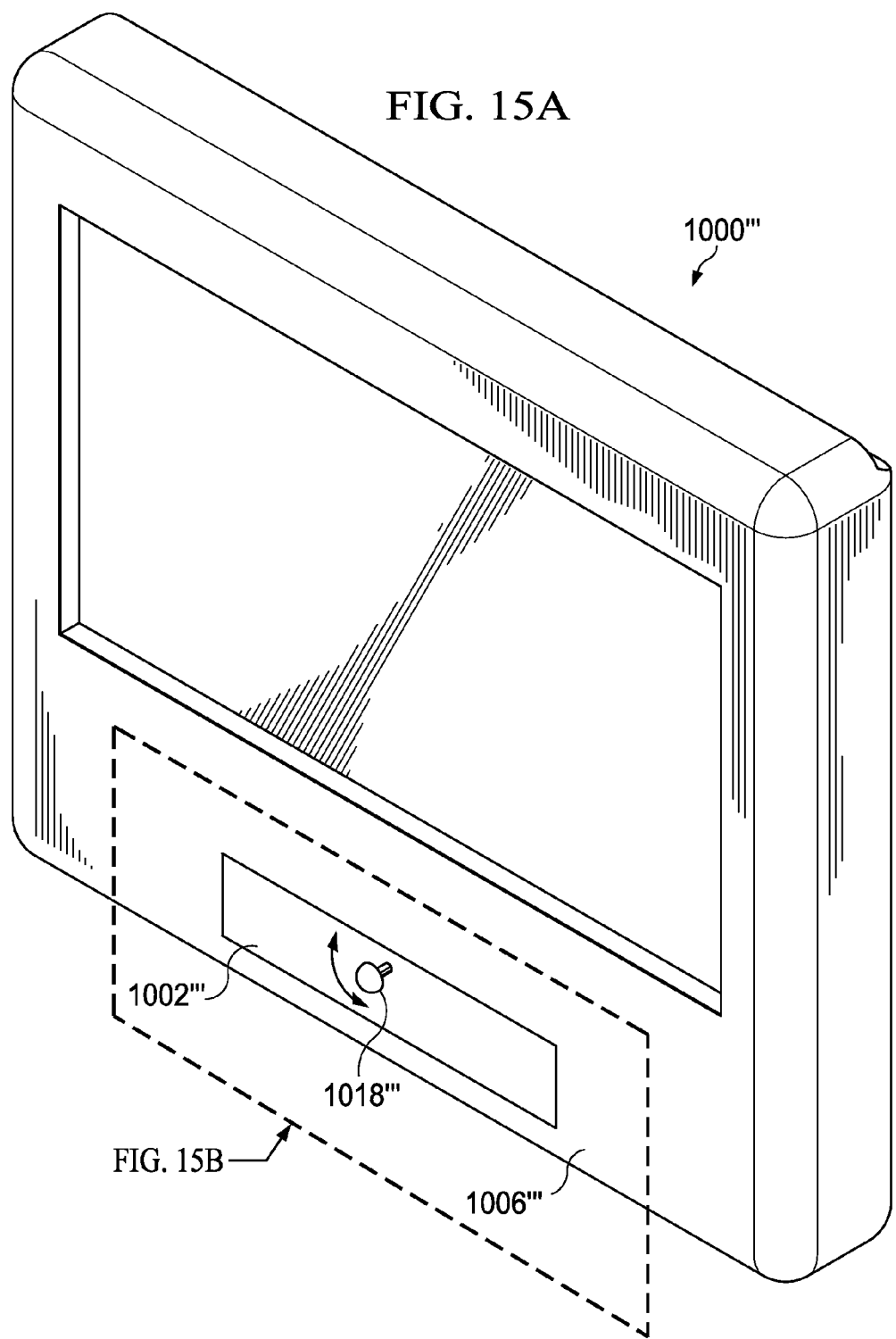

US 7,817,003 B2

DEVICE AND METHOD FOR ENABLING A COVER TO BE ATTACHED TO AND REMOVED FROM A COMPARTMENT WITHIN THE DEVICE

CROSS REFERENCE TO RELATED APPLICATIONS

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to a device that incorporates correlated magnets which enable a cover to be easily and effectively attached to and removed from a compartment. Some examples of such a device include a remote control unit, a calculator, a clock-radio, a mobile phone, a laptop computer, a personal digital assistant (PDA), a camera, a television, a portable media player, and a handheld electronic game unit.

DESCRIPTION OF RELATED ART

Traditional devices (e.g., remote control unit, calculator, clock-radio, mobile phone, laptop computer, PDA, camera, television, portable media player, handheld electronic game unit) employ screws, push-release mechanisms, turn-knobs or other known fastening mechanisms to attach or remove a cover (e.g., battery cover) to or from a compartment (e.g., battery compartment). These fastening mechanisms all require a great degree of dexterity and patience on the part of the person to use when they want to attach or remove a cover (e.g., battery cover) to or from a compartment (e.g., battery compartment). Moreover, such mechanism (e.g., small screws) can be easily dropped and lost and can also be damaged (e.g., stripped screw heads). Thus, there has been a need for a device (e.g., remote control unit, calculator, clock-radio, mobile phone, laptop computer, PDA, camera, television, a portable media player, handheld electronic game unit) that is configured such that it is easy for the person to attach or remove a cover (e.g., battery cover) to or from a compartment (e.g., battery compartment). This need and other needs are satisfied by the present invention.

SUMMARY

In one aspect, the present invention provides a device with a structure that has a cover including a first field emission structure, and a compartment including a second field emission structure. The cover is attached to the compartment so as to enclose a space within the compartment when the first and second field emission structures are located next to one another and have a certain alignment with respect to one another. The first and second field emission structures each include field emission sources having positions and polarities relating to a desired spatial force function that corresponds to a relative alignment of the first and second field emission structures within a field domain. The cover can be released from the compartment to provide access to the space within the compartment when the first field emission structure is turned with respect to the second field emission structure.

In another aspect, the present invention provides a method for enabling a cover to be attached to and removed from a compartment within a device. The method includes the steps of: (a) attaching a first field emission structure to the cover; (b) attaching a second field emission structure to the compartment; and (c) aligning the first and second field emission structures so the cover attaches to the compartment and encloses a space within the compartment when the first and second field emission structures are located next to one another and have a certain alignment with respect to one another. The first and second field emission structures each include field emission sources having positions and polarities relating to a desired spatial force function that corresponds to a relative alignment of the first and second field emission structures within a field domain. The cover can be released from the compartment to provide access to the space within the compartment when the first field emission structure is turned with respect to the second field emission structure.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIGS. 15A-15B are diagrams of an exemplary television that incorporates correlated magnets which enable a cover to be easily and effectively attached to and removed from a compartment in accordance with an embodiment of the present invention.

DETAILED DESCRIPTION

The present invention includes a device that incorporates correlated magnets which enable a cover (e.g., battery cover) to be easily and effectively attached to and removed from a compartment (e.g., battery compartment). Some examples of such a device include a remote control unit, a calculator, a clock-radio, a mobile phone, a laptop computer, a PDA, a camera, a television, portable media player and a handheld electronic game unit. The device of the present invention is made possible, in part, by the use of an emerging, revolutionary technology that is called correlated magnetics. This revolutionary technology referred to herein as correlated magnetics was first fully described and enabled in the co-assigned U.S. patent application Ser. No. 12/123,718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358,423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476,952 filed on Jun. 2, 2009 and entitled "A Field Emission System and Method". The contents of this document are hereby incorporated herein by reference. Another technology known as correlated inductance, which is related to correlated magnetics, has been described and enabled in the co-assigned U.S. patent application Ser. No. 12/322,561 filed on Feb. 4, 2009 and entitled "A System and Method for Producing and Electric Pulse". The contents of this document are hereby incorporated by reference. A brief discussion about correlated magnetics is provided first before a detailed discussion is provided about the correlated magnetic device and a method for enabling a cover to be attached to and removed from a compartment within the correlated magnetic device.

Correlated Magnetics Technology

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
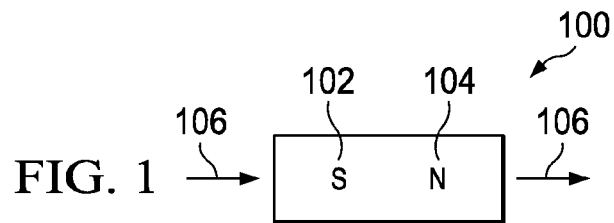
FIGS. 1-9 are various diagrams used to help explain different concepts about correlated magnetic technology which can be utilized in an embodiment of the present invention.

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
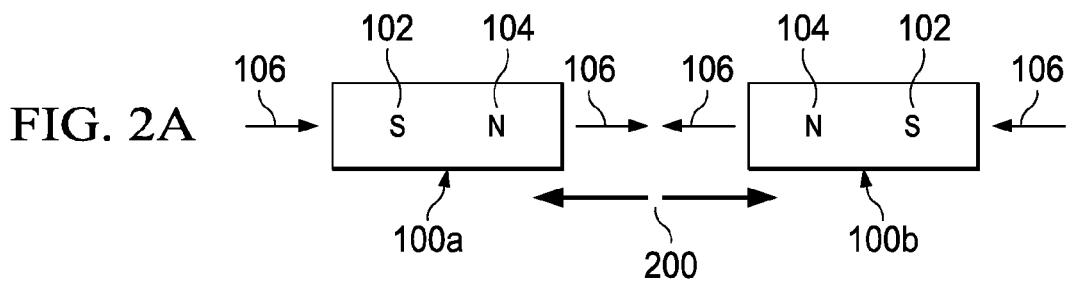
Figure 2B:
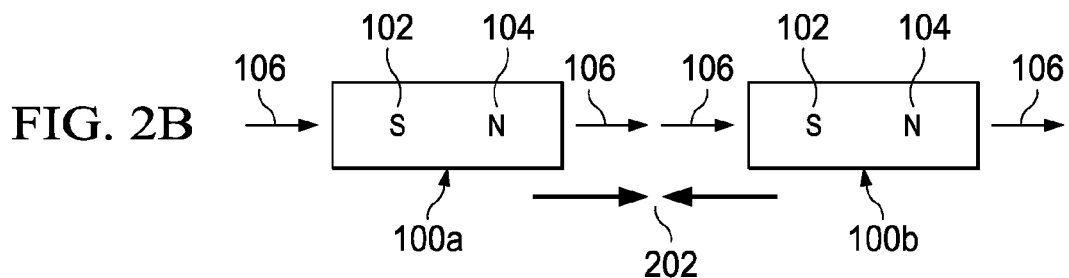
Figure 2C:
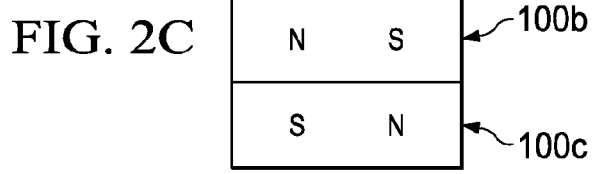

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Figure 3A:
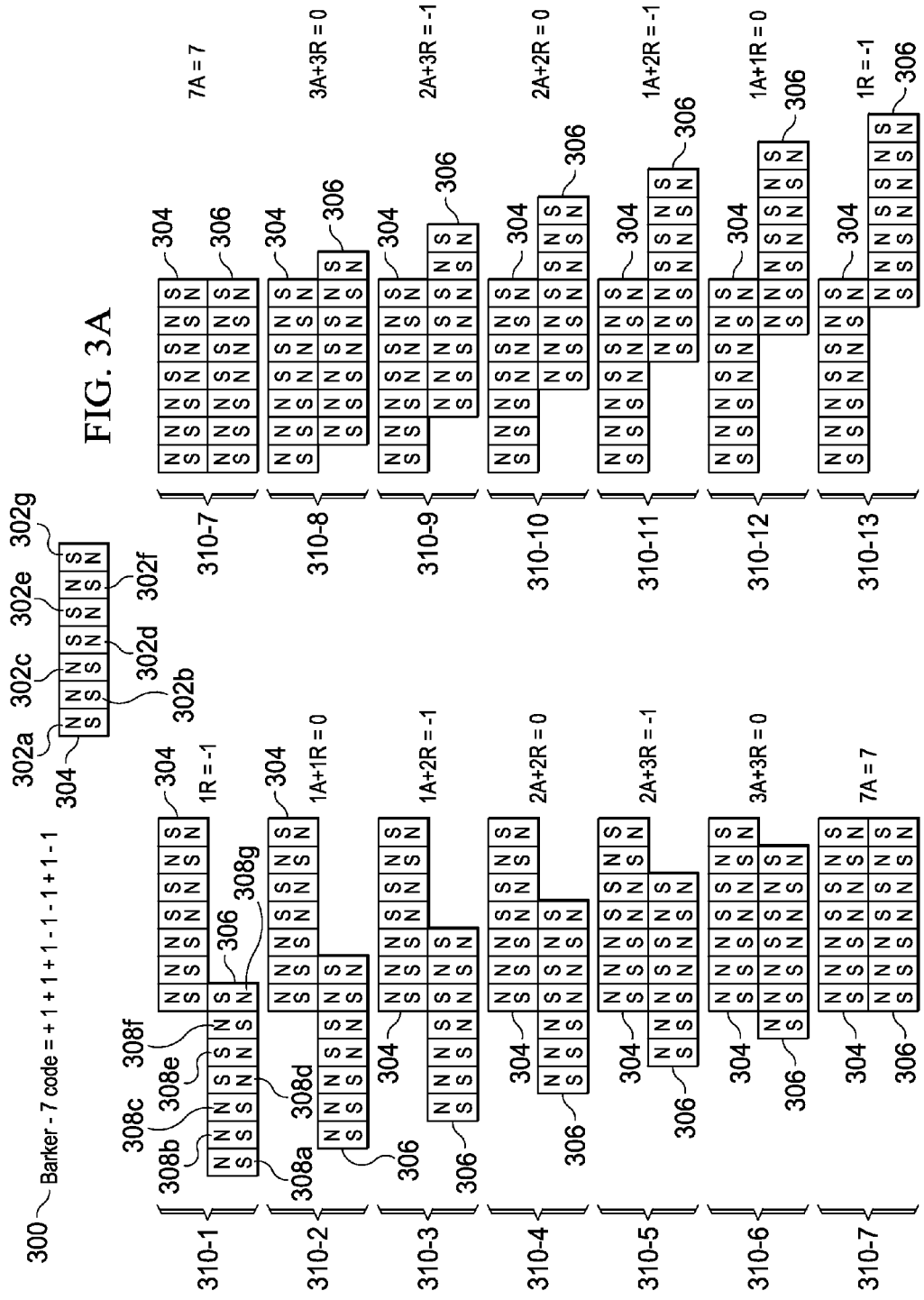

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R. A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4A:
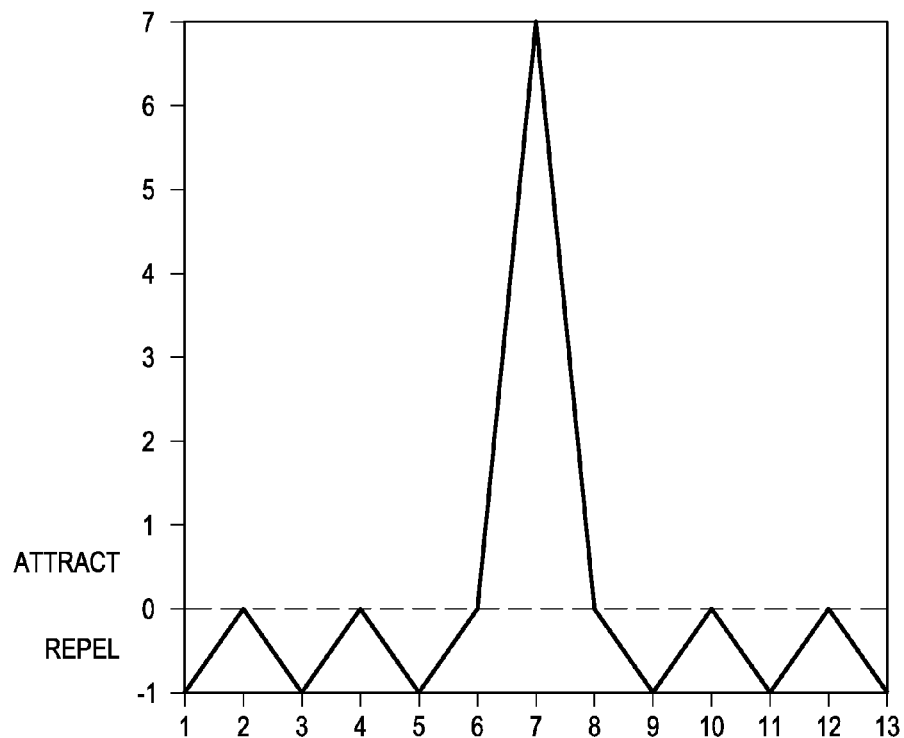
Figure 4A:
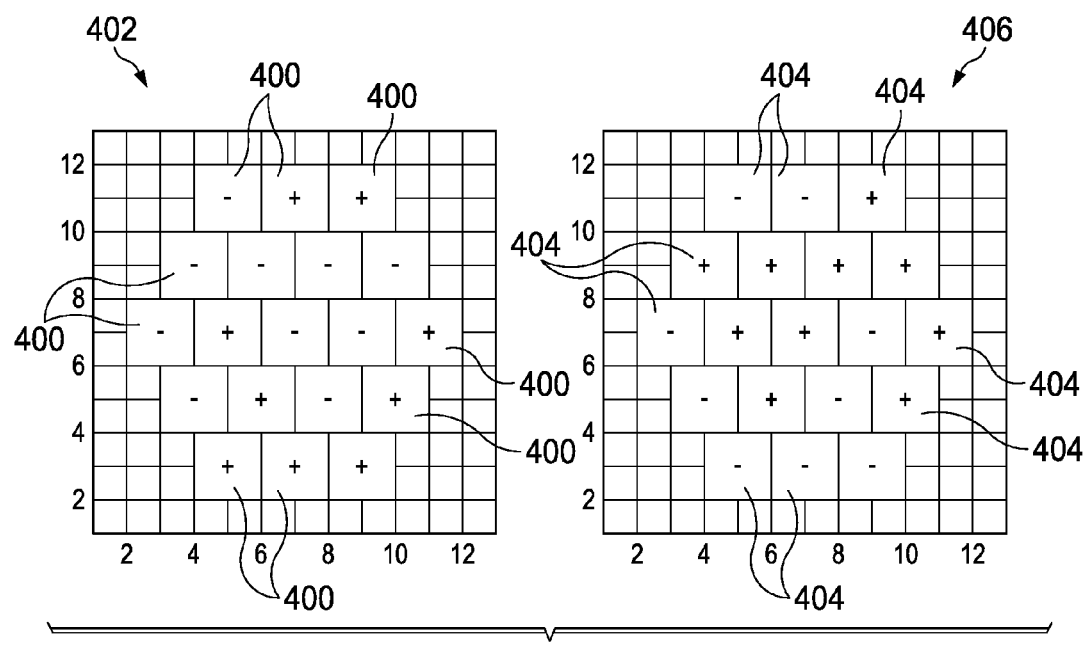
Figure 4B:
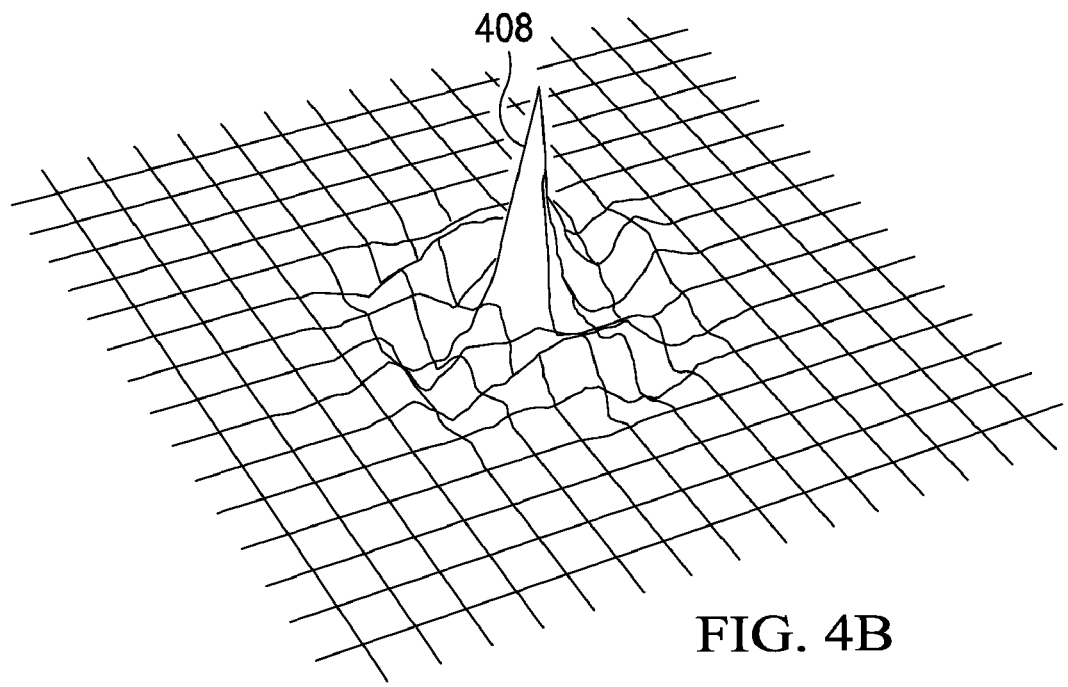
Figure 4C:
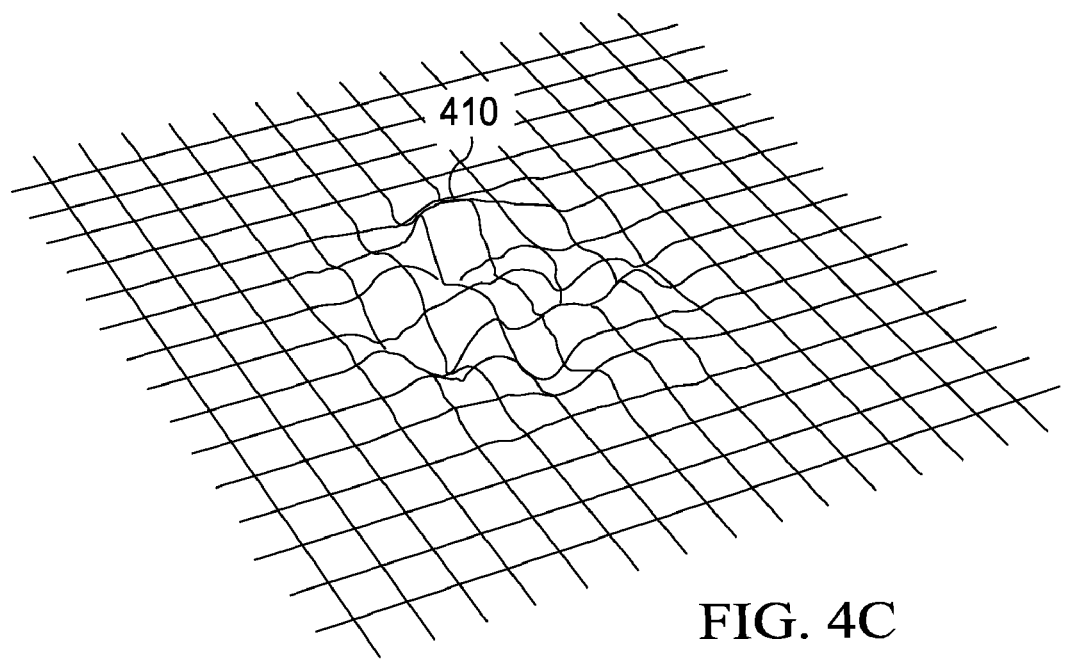

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
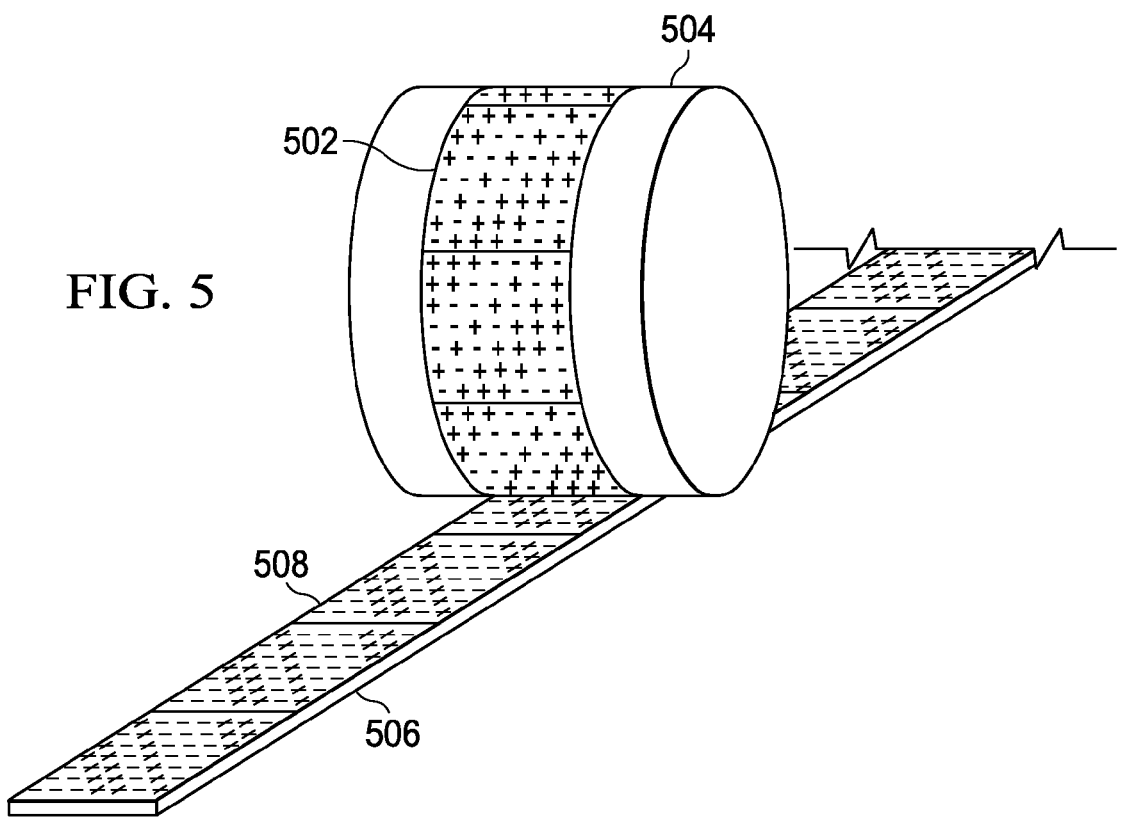

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
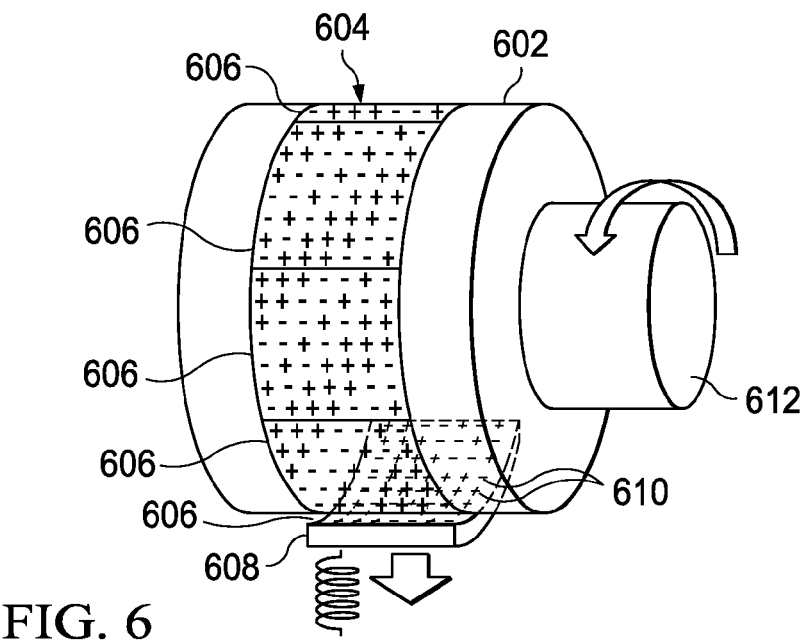

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
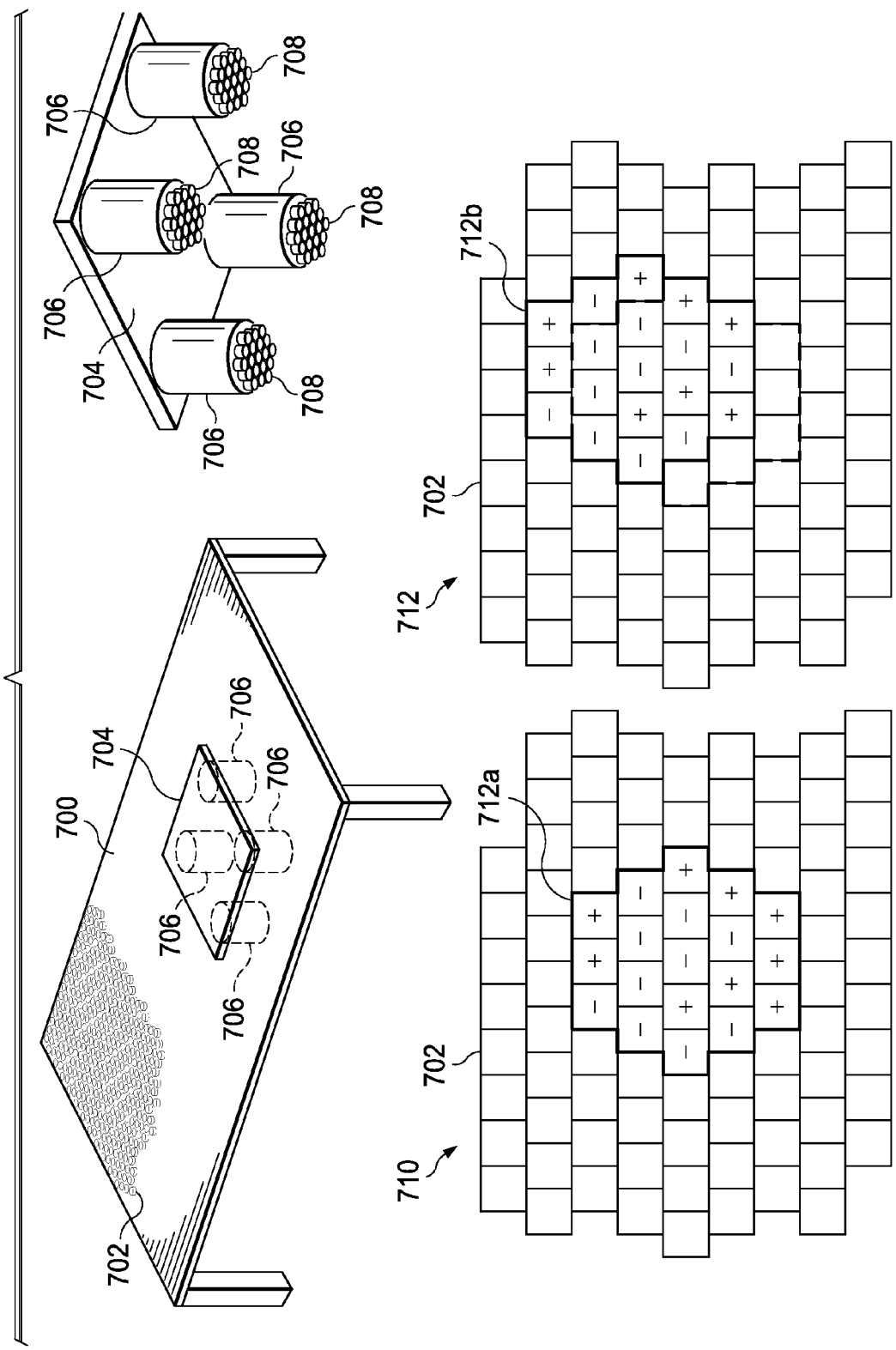

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
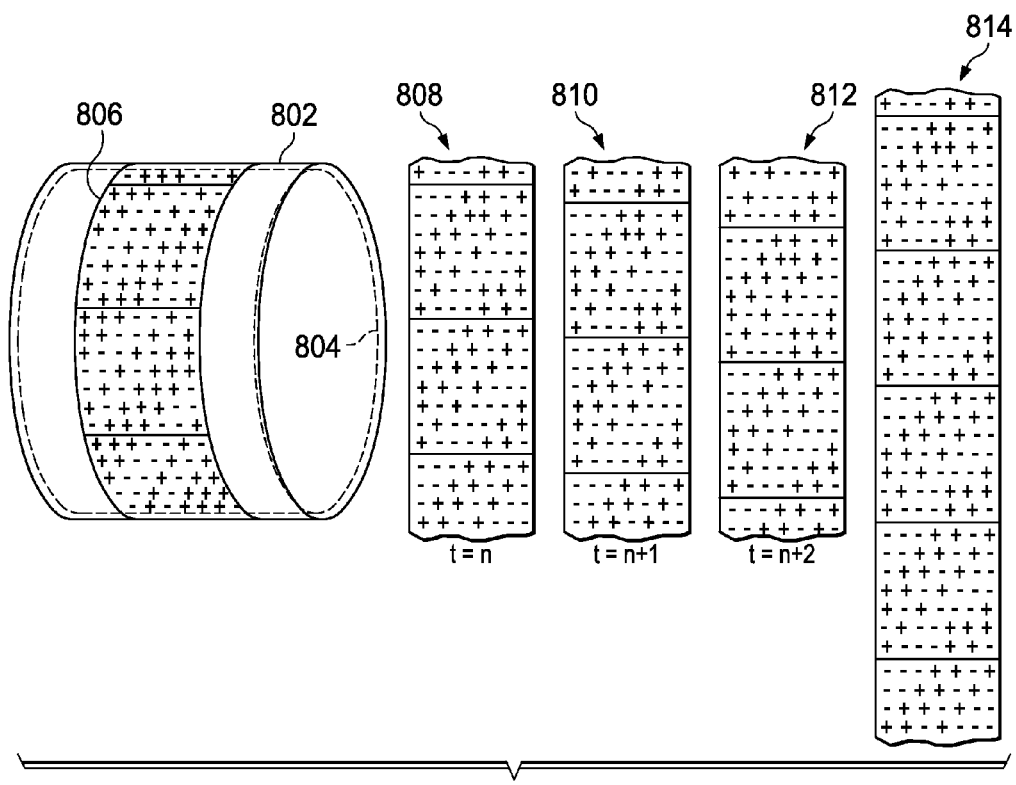

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
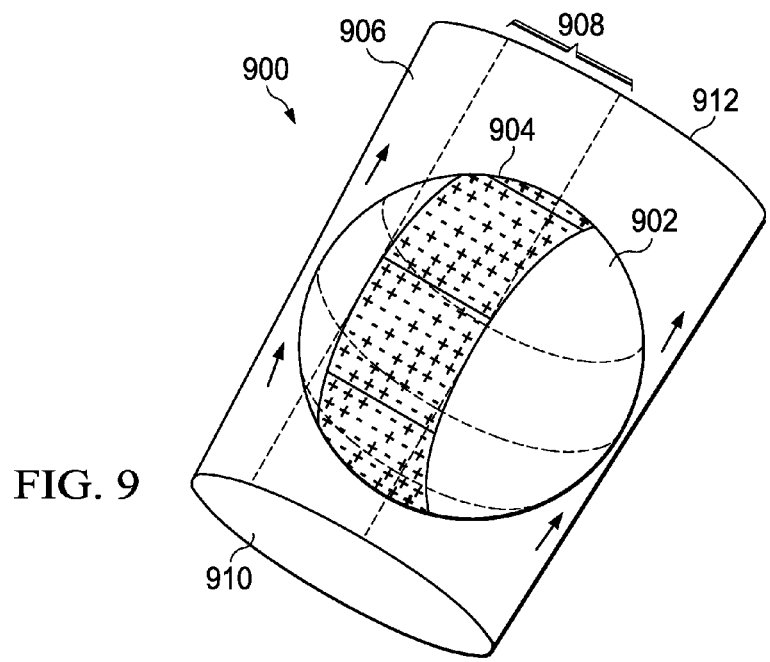

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Correlated Magnetic Device

Referring to FIGS. 10A-10D, there are several diagrams of an exemplary device 1000 that has a correlated magnetic cover 1002 which can be easily and effectively attached to and removed from a correlated magnetic compartment 1004 in accordance with an embodiment of the present invention. The device 1000 has a body 1006 configured to receive the cover 1002 which can be attached to the compartment 1004 to enclose a space 1008 within the compartment 1004 (see FIGS. 10A-10B and 10D). The cover 1002 when removed from the compartment 1004 provides access to the space 1008 within the compartment 1004 (see FIG. 10C). In this example, the device 1000 has a body 1006 shaped like a box but it could be any shape and still be considered within the scope of the present invention so long as the device 1000 has the correlated magnetic cover 1002 and the correlated magnetic compartment 1004.

Figure 10A:
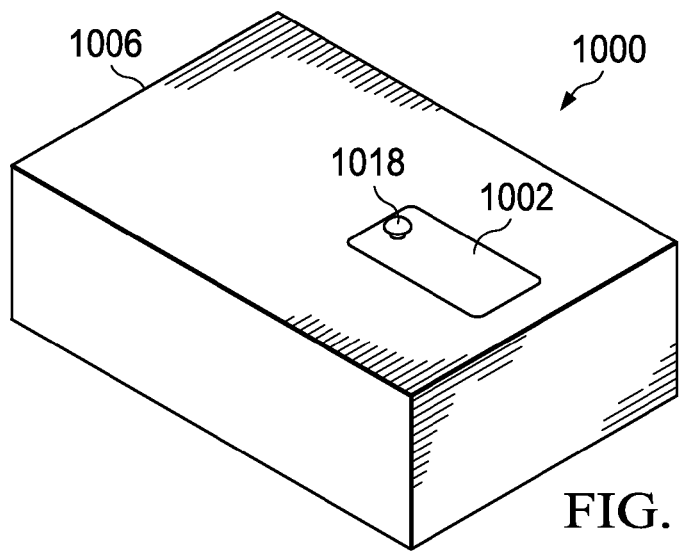
FIGS. 10A-10D are several different diagrams of an exemplary device that incorporates correlated magnets which enable a cover to be easily and effectively attached to and removed from a compartment in accordance with an embodiment of the present invention.
Figure 10B:
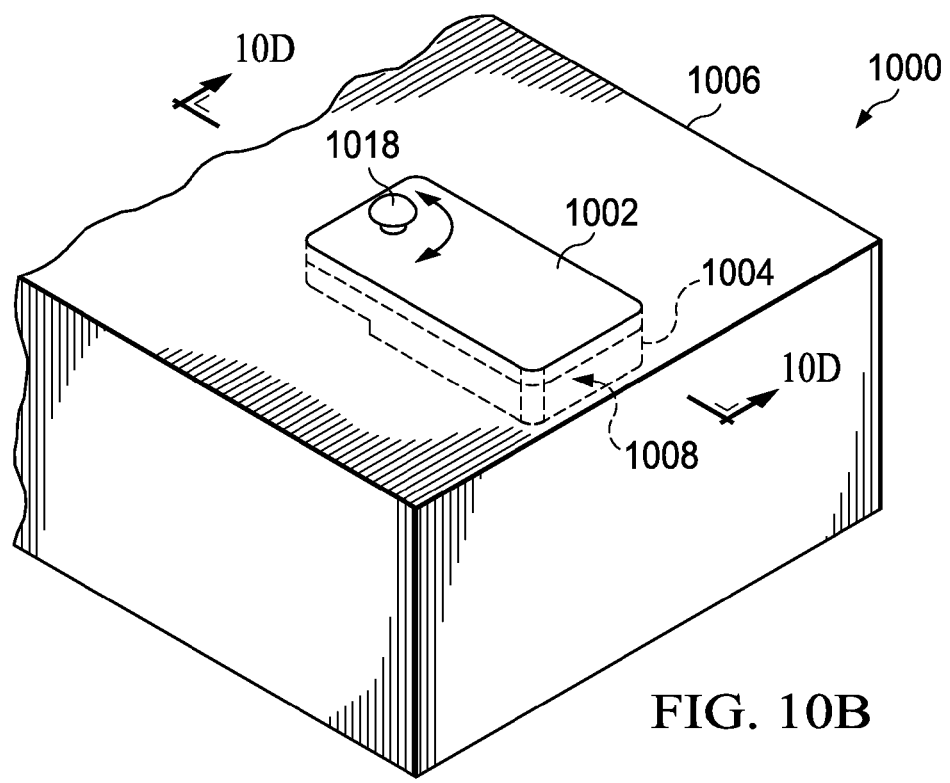
Figure 10C:
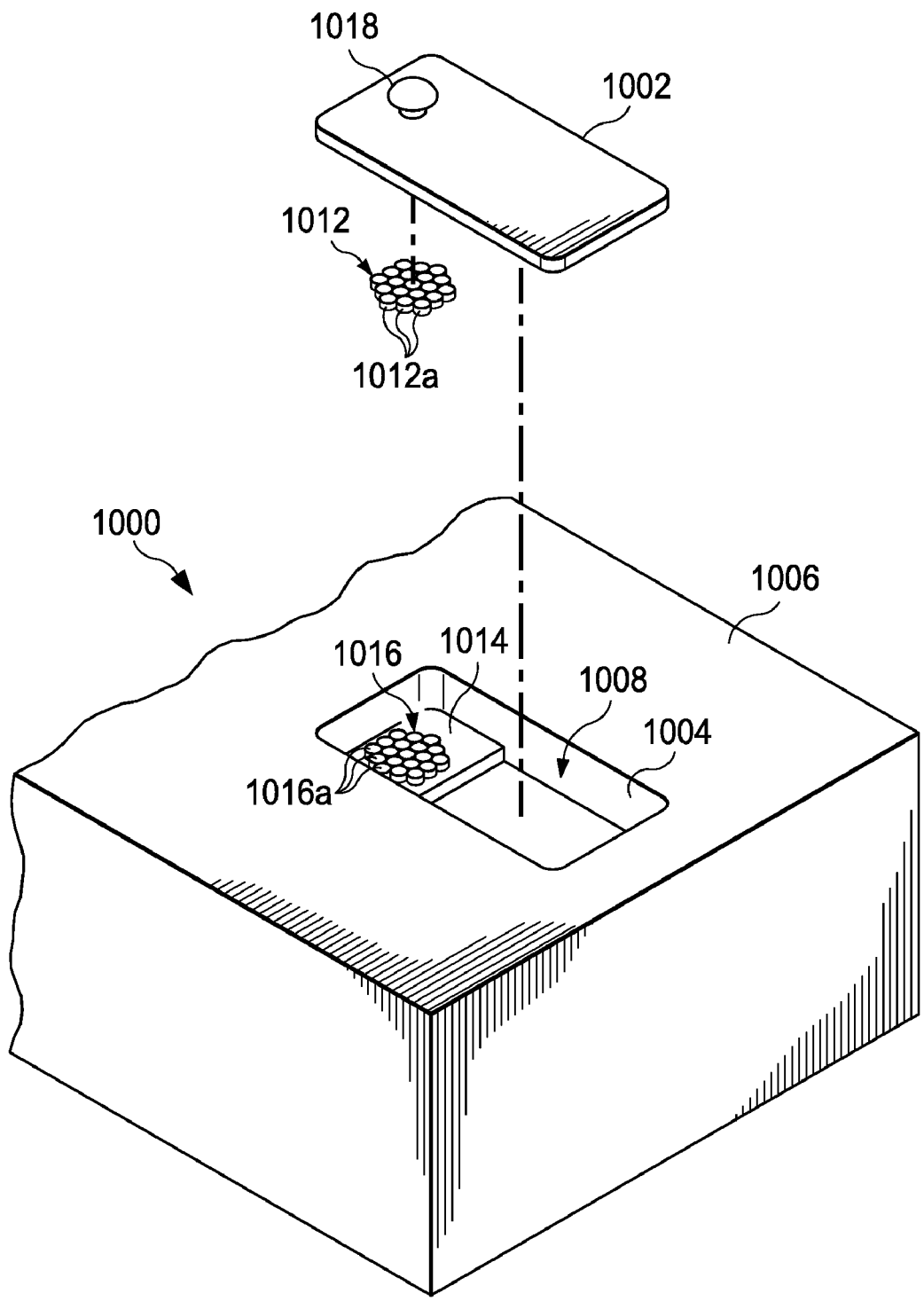
Figure 10D:
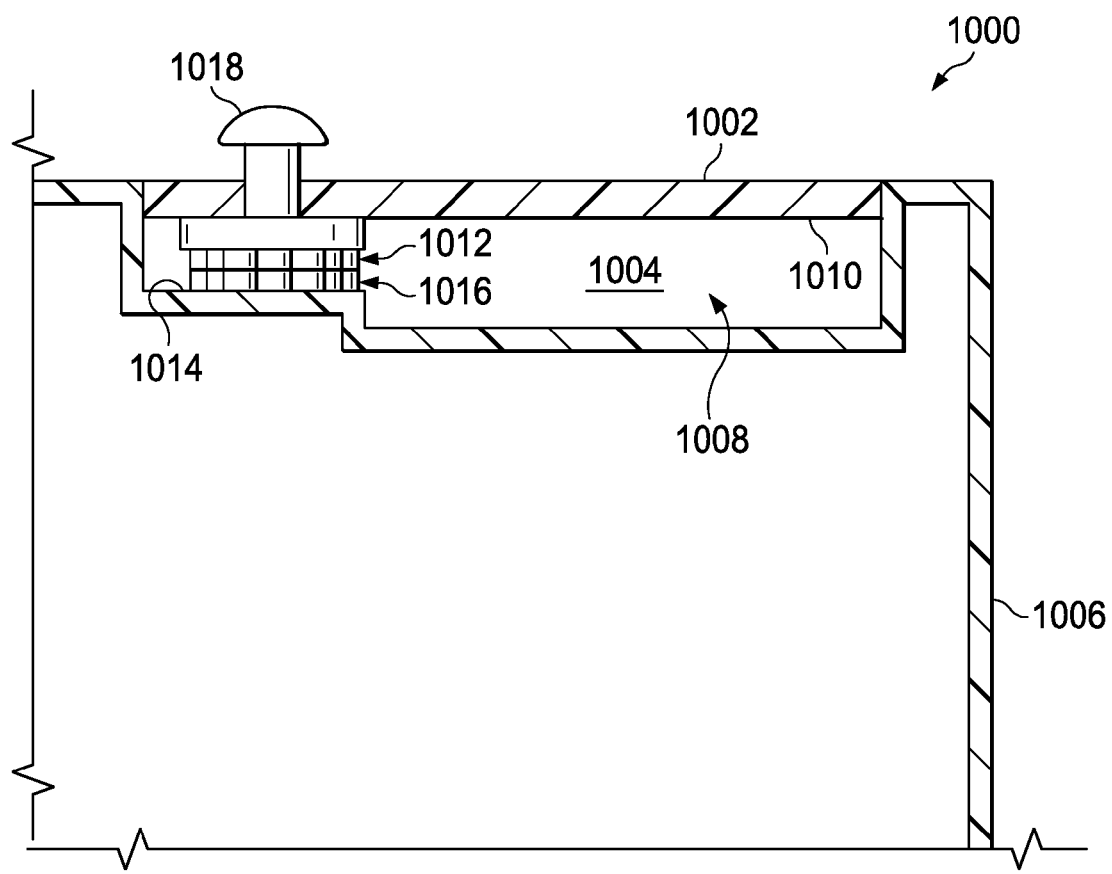

The cover 1002 has a surface 1010 with which there is associated a first field emission structure 1012 (more possible) (see FIGS. 10C-10D). In this example, the first field emission structure 1012 is shown as being attached to a release mechanism 1018 and extending outwards from the surface 1010 of the cover 1002. Alternatively, the first field emission structure 1012 could be flush with the surface 1010 of the cover 1002. Or, the first field emission structure 1012 could be recessed within the surface 1010 of the cover 1002 such that it is not visible. The compartment 1004 has a surface 1014 on which there is attached or incorporated therein a second field emission structure 1016 (more possible)(see FIG. 10C-10D). In this example, the second field emission structure 1016 is shown as extending up from the surface 1014 of the compartment 1004. Alternatively, the second field emission structure 1016 could be flush with the surface 1014 of the compartment 1004. Or, the second field emission structure 1016 could be recessed within the surface 1014 of the compartment 1004 such that it is not visible. The first and second field emission structures 1012 and 1016 depicted in FIGS. 10A-10B and in other drawings associated with other exemplary correlated magnetic devices 1000', 1000" and 1000''' are themselves exemplary. Generally, the field emission structures 1012 and 1016 could have many different configurations and could be many different types of permanent magnets, electromagnets, and/or electro-permanent magnets where their size, shape, source strengths, coding, and other characteristics can be tailored to meet different requirements.

The first magnetic field emission structure 1012 is configured to interact (correlate) with the second magnetic field emission structure 1016 such that the cover 1002 can, when desired, be substantially aligned to become attached (secured) to the compartment 1004 or misaligned to become removed (detached) from the compartment 1004. In particular, the cover 1002 can be attached to the compartment 1004 when their respective first and second magnetic field emission structures 1012 and 1016 are located next to one another and have a certain alignment with respect to one another (see FIGS. 10A-10B and 10D). Under one arrangement, the cover 1002 would be attached to the compartment 1004 with a desired strength to prevent the cover 1002 from being inadvertently disengaged from the compartment 1004. The cover 1002 can be released from the compartment 1004 when their respective first and second magnetic field emission structures 1012 and 1016 are turned with respect to one another (see FIG. 10C). In this example, an optional release mechanism 1018 can be used to turn the first magnetic field emission structure 1012 with respect to the second magnetic field emission structure 1016 so as to release or attach the cover 1002 from or to the compartment 1004 (see FIGS. 11-12).

The process of attaching and detaching the cover 1002 to and from the compartment 1004 is possible because the first and second magnetic field emission structures 1012 and 1016 each comprise an array of field emission sources 1012a and 1016a (e.g., an array of magnets 1012a and 1016a) and each array has sources with positions and polarities relating to a desired spatial force function that corresponds to a relative alignment of the first and second magnetic field emission structures 1012 and 1016 within a field domain (see discussion about correlated magnet technology). In this example, the first and second magnetic field emissions structures 1012 and 1016 both have the same code but are a mirror image of one another (see FIGS. 4 and 11). An example of how the cover 1002 can be attached (secured) to or removed from the compartment 1004 with the aid of the optional release mechanism 1018 is discussed in detail below with respect to FIGS. 11A-11I.

Figure 11A:
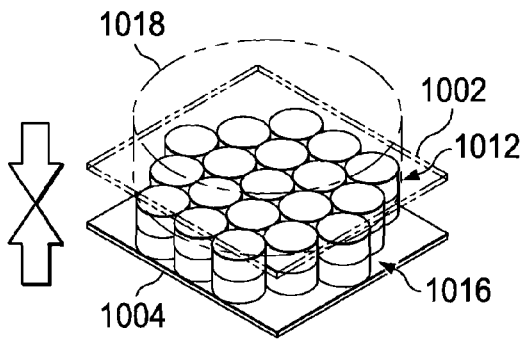
FIGS. 11A-11I are several diagrams that illustrate a portion of the cover and the compartment shown in FIGS. 10A-10B which are used to show how an exemplary first magnetic field emission structure (associated with the cover) and its mirror image second magnetic field emission structure (associated with the compartment) can be aligned or misaligned relative to each other to enable one to secure or remove the cover to or from the compartment in accordance with an embodiment of the present invention.
Figure 11D:
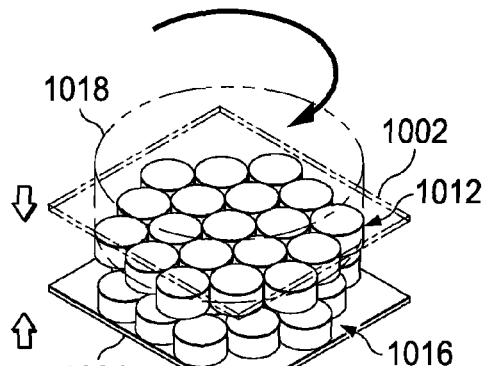
Figure 11B:
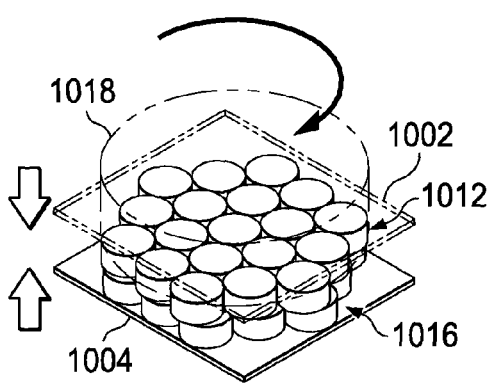
Figure 11E:
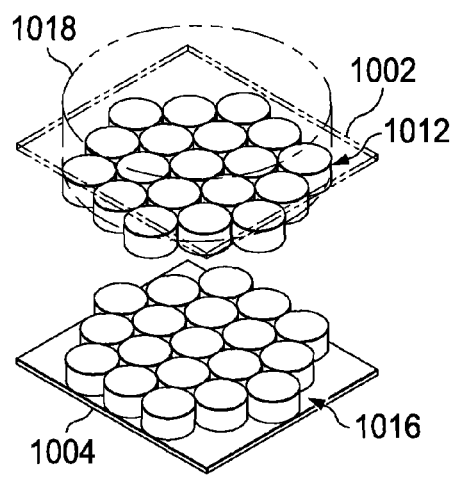
Figure 11C:
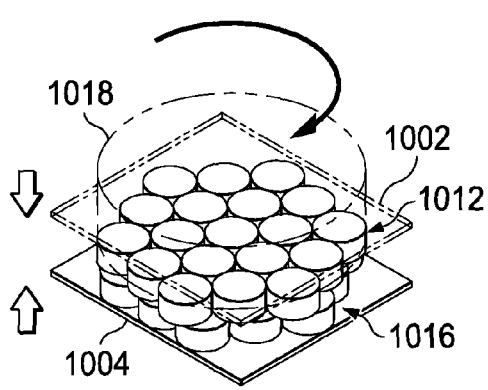
Figure 11F:
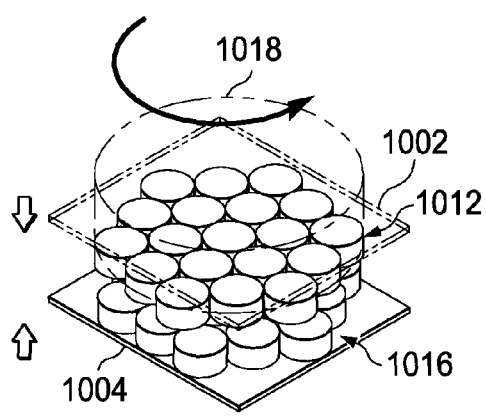
Figure 11G:
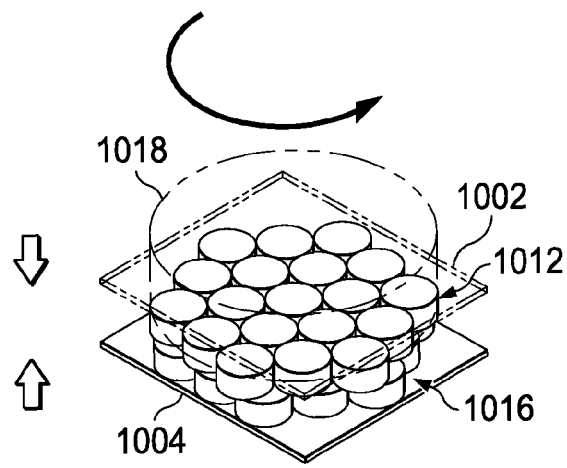
Figure 11H:
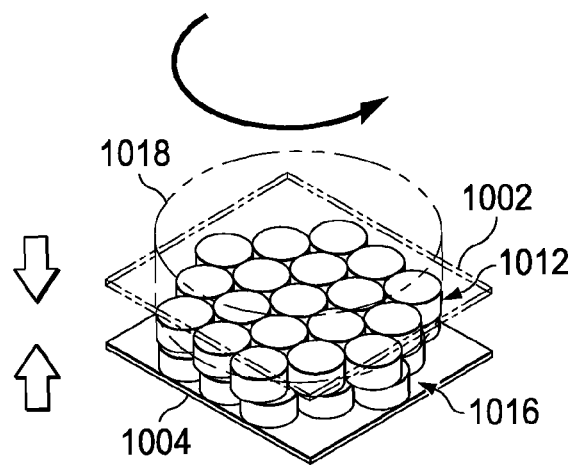
Figure 11I:
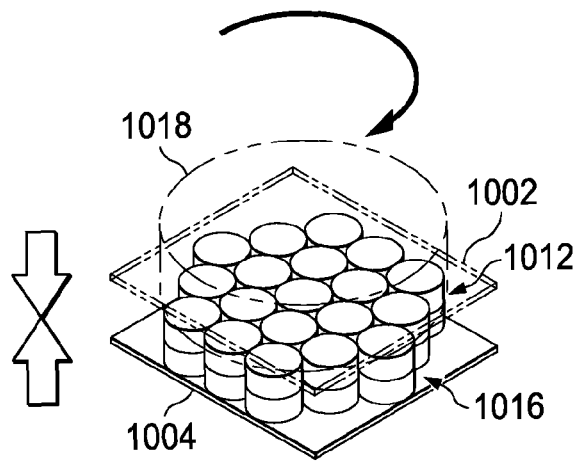

Referring to FIGS. 11A-11I, there is depicted an exemplary selected first magnetic field emission structure 1012 (associated with the cover 1002) and its mirror image second magnetic field emission structure 1016 (associated with the compartment 1004) and the resulting spatial forces produced in accordance with their various alignments as they are twisted relative to each other which enables one to attach or remove the cover 1002 to or from the compartment 1004. In FIG. 11A, the first magnetic field emission structure 1012 (attached to the optional release mechanism 1018) and the mirror image second magnetic field emission structure 1016 are aligned producing a peak spatial force. In FIG. 11B, the first magnetic field emission structure 1012 is rotated by the release mechanism 1018 clockwise slightly relative to the mirror image second magnetic field emission structure 1016 and the attractive force reduces significantly. In this example, the cover 1002 itself is not rotated but the release mechanism 1018 is used to rotate the first magnetic field emission structure 1012. In FIG. 11C, the first magnetic field emission structure 1012 is further rotated by the release mechanism

1018 and the attractive force continues to decrease. In FIG. 11D, the first magnetic field emission structure 1012 is still further rotated by the release mechanism 1018 until the attractive force becomes very small, such that the two magnetic field emission structures 1012 and 1016 are easily separated as shown in FIG. 11E. One skilled in the art would also recognize that the cover 1002 and the compartment 1004 can also be detached by applying a pull force, shear force, or any other force sufficient to overcome the attractive peak spatial force between the substantially aligned first and second field emission structures 1012 and 1016. Given the two magnetic field emission structures 1012 and 1016 are held somewhat apart as in FIG. 11E, the two magnetic field emission structures 1012 and 1016 can be moved closer and rotated towards alignment producing a small spatial force as in FIG. 11F. The spatial force increases as the two magnetic field emission structures 1012 and 1016 become more and more aligned in FIGS. 11G and 11H and a peak spatial force is achieved when aligned as in FIG. 11I. It should be noted that the direction of rotation was arbitrarily chosen and may be varied depending on the code employed. Additionally, the first and second magnetic field emission structures 1012 and 1016 are mirror images of one another which results in an attractive peak spatial force (see also FIGS. 3-4). This way of securing and removing the cover 1002 to and from the compartment 1004 is a marked-improvement over the prior art in which the conventional device employed screws, push-release mechanisms, turn-knobs or other known fastening mechanisms which require a great degree of dexterity and patience on the part of the person to use when they want to attach or remove a cover (e.g., battery cover) to or from a compartment (e.g., battery compartment).

Figure 12A:
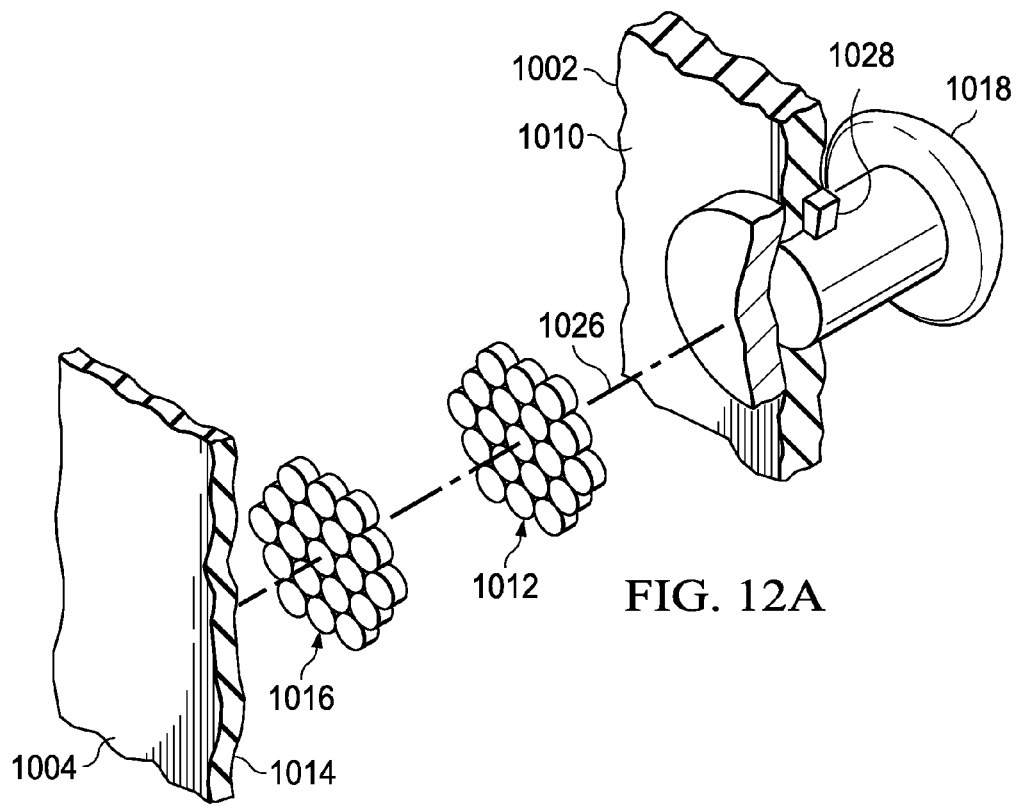
FIGS. 12A-12C illustrate several diagrams of an exemplary release mechanism that can be incorporated within the cover shown in FIGS. 10-11 in accordance with an embodiment of the present invention.
Figure 12B:
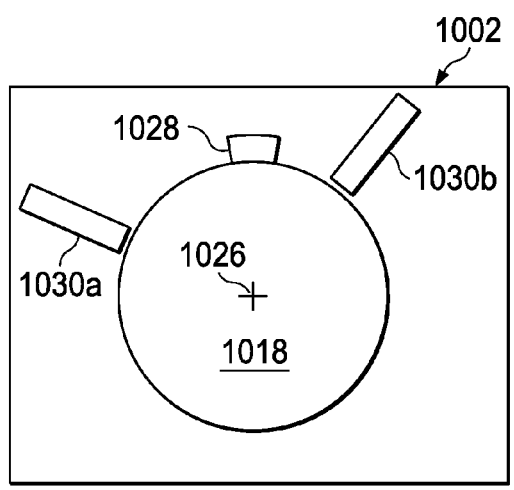
Figure 12C:
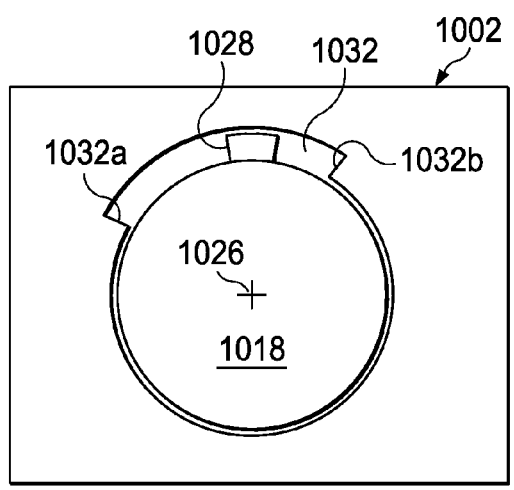
Figure 13A:
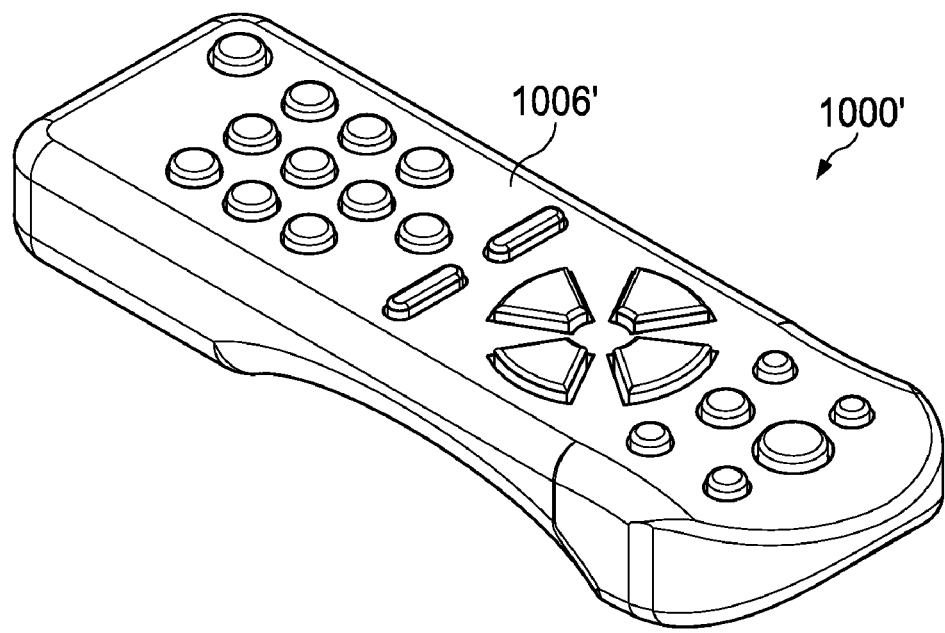
FIGS. 13A-13D are several different diagrams of an exemplary remote control unit that incorporates correlated magnets which enable a battery cover to be easily and effectively attached to and removed from a battery compartment in accordance with an embodiment of the present invention.
Figure 13B:
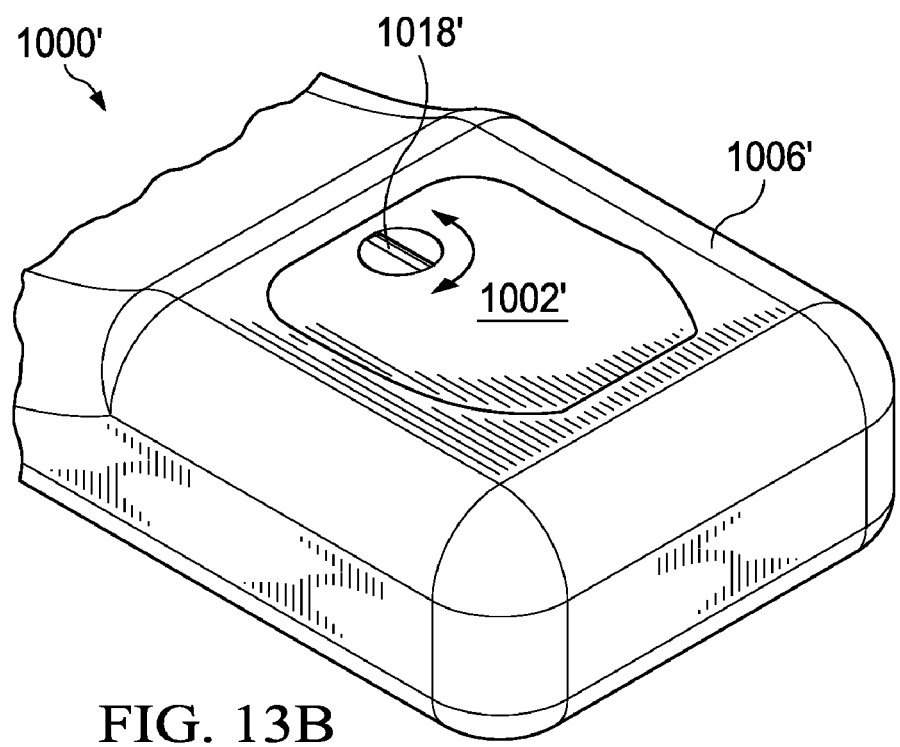
Figure 13C:
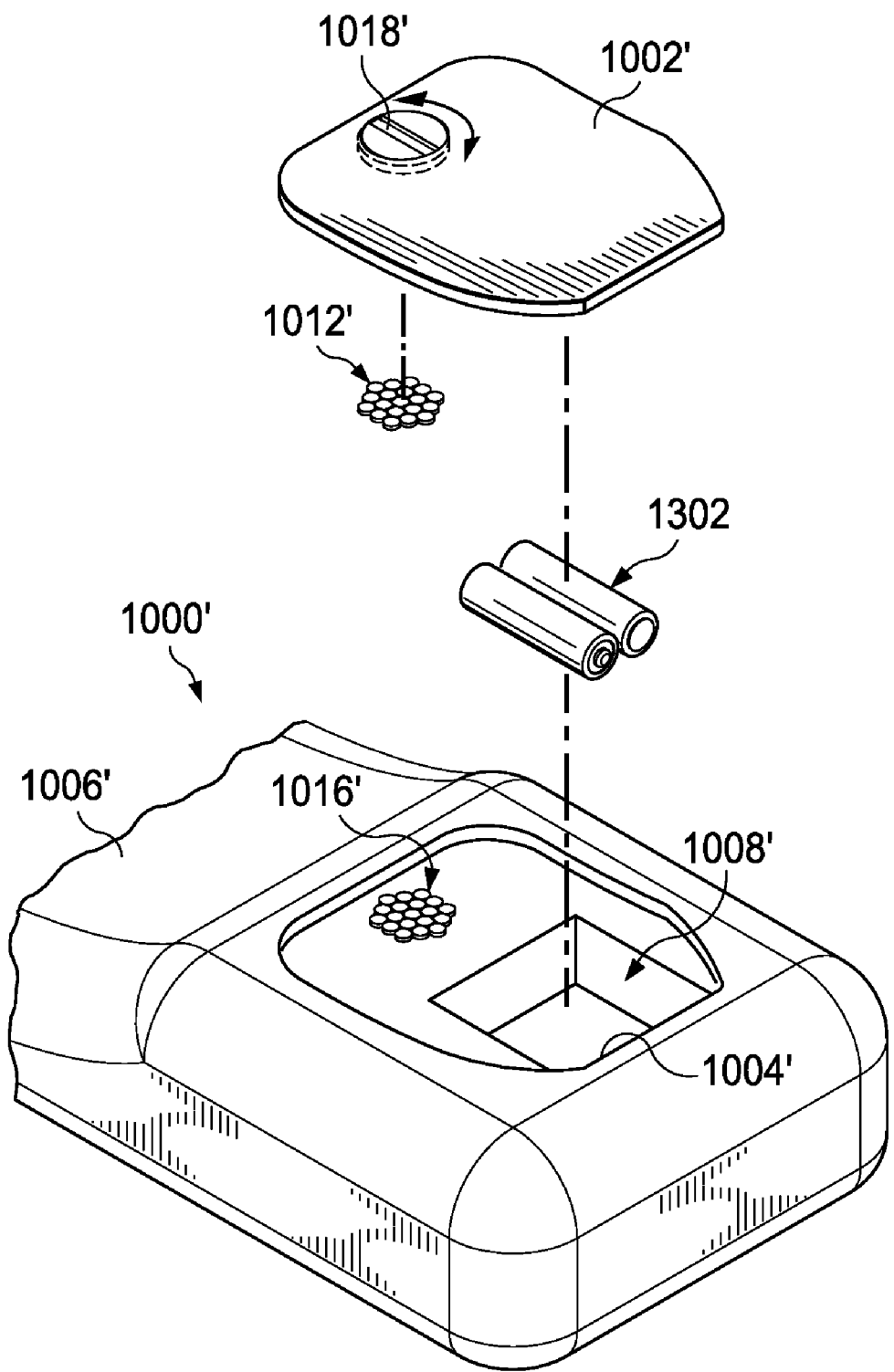
Figure 13D:
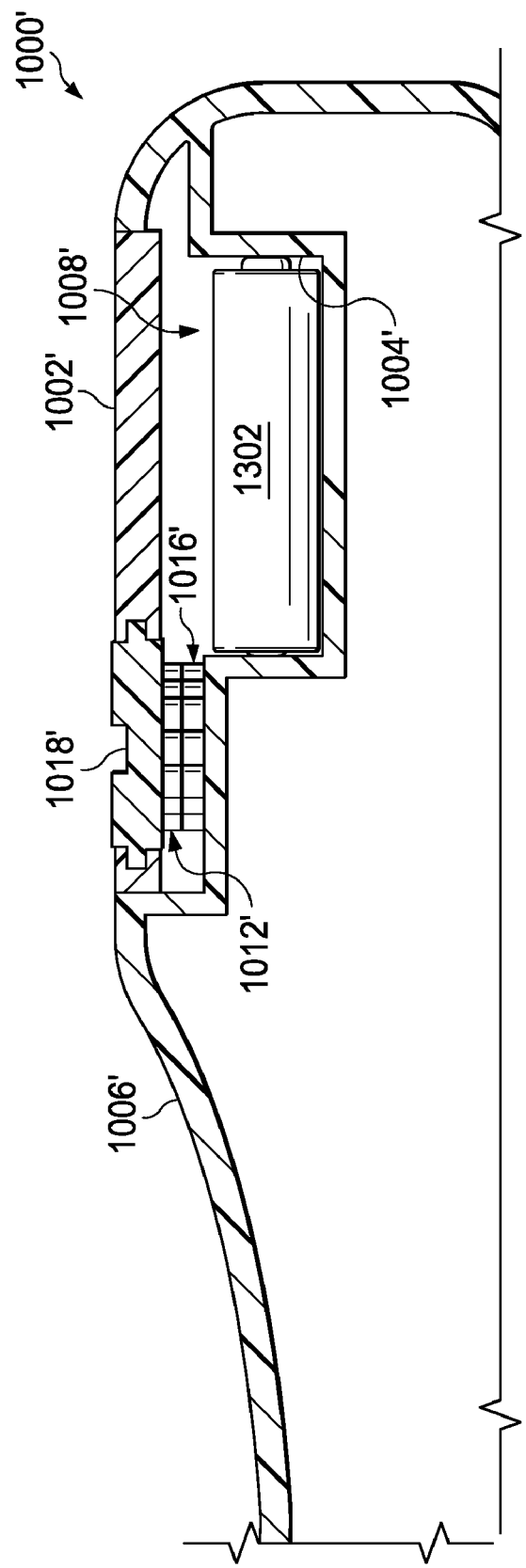
Figure 14A:
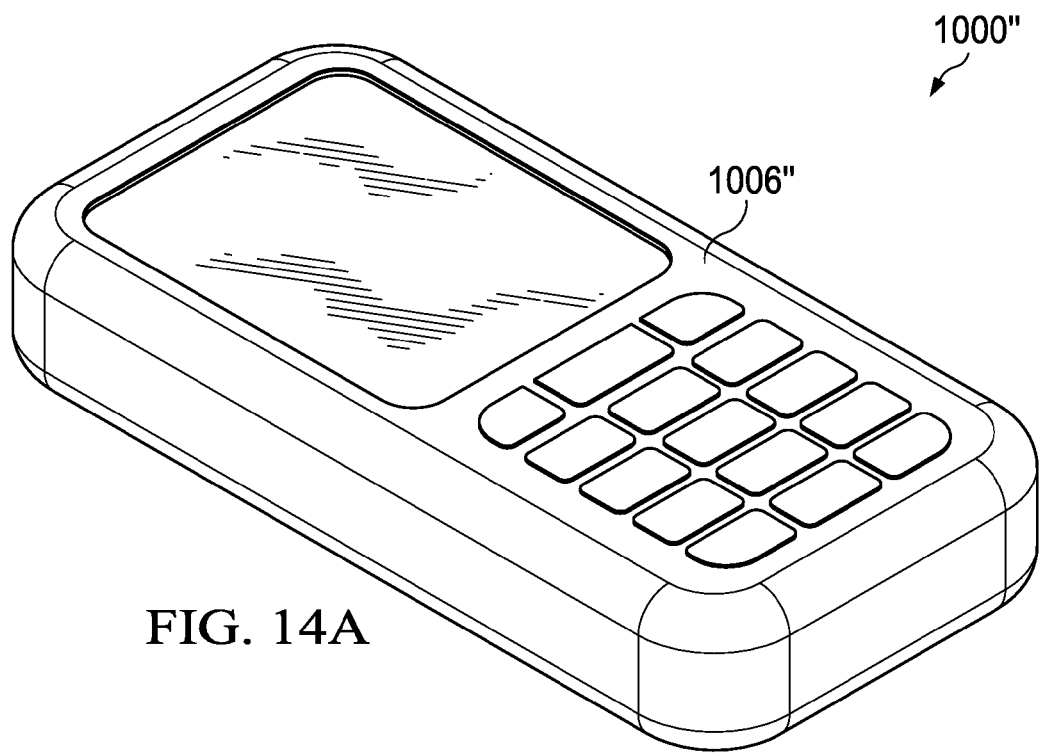
FIGS. 14A-14D are several different diagrams of an exemplary mobile phone that incorporates correlated magnets which enable a battery cover to be easily and effectively attached to and removed from a battery compartment in accordance with an embodiment of the present invention.
Figure 14B:
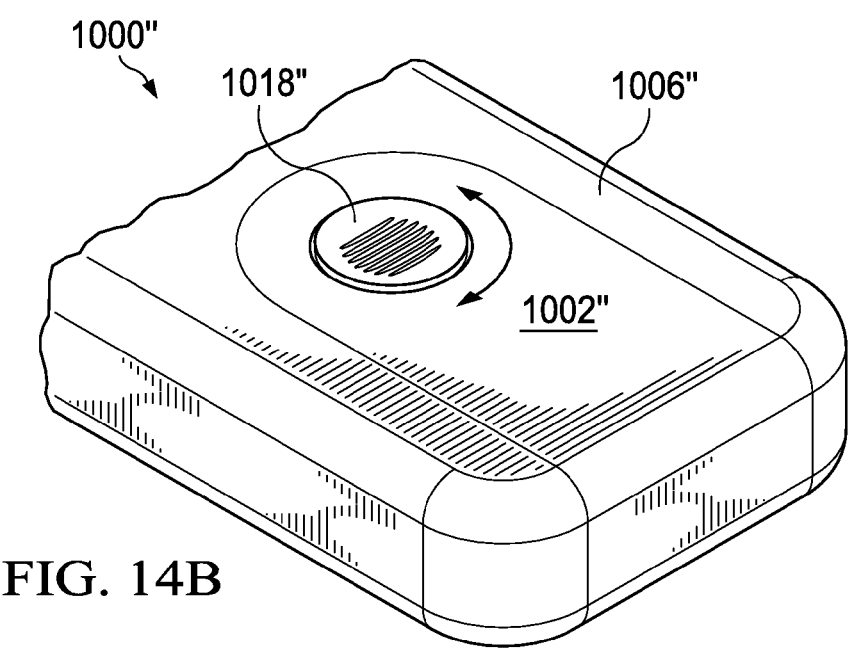
Figure 14C:
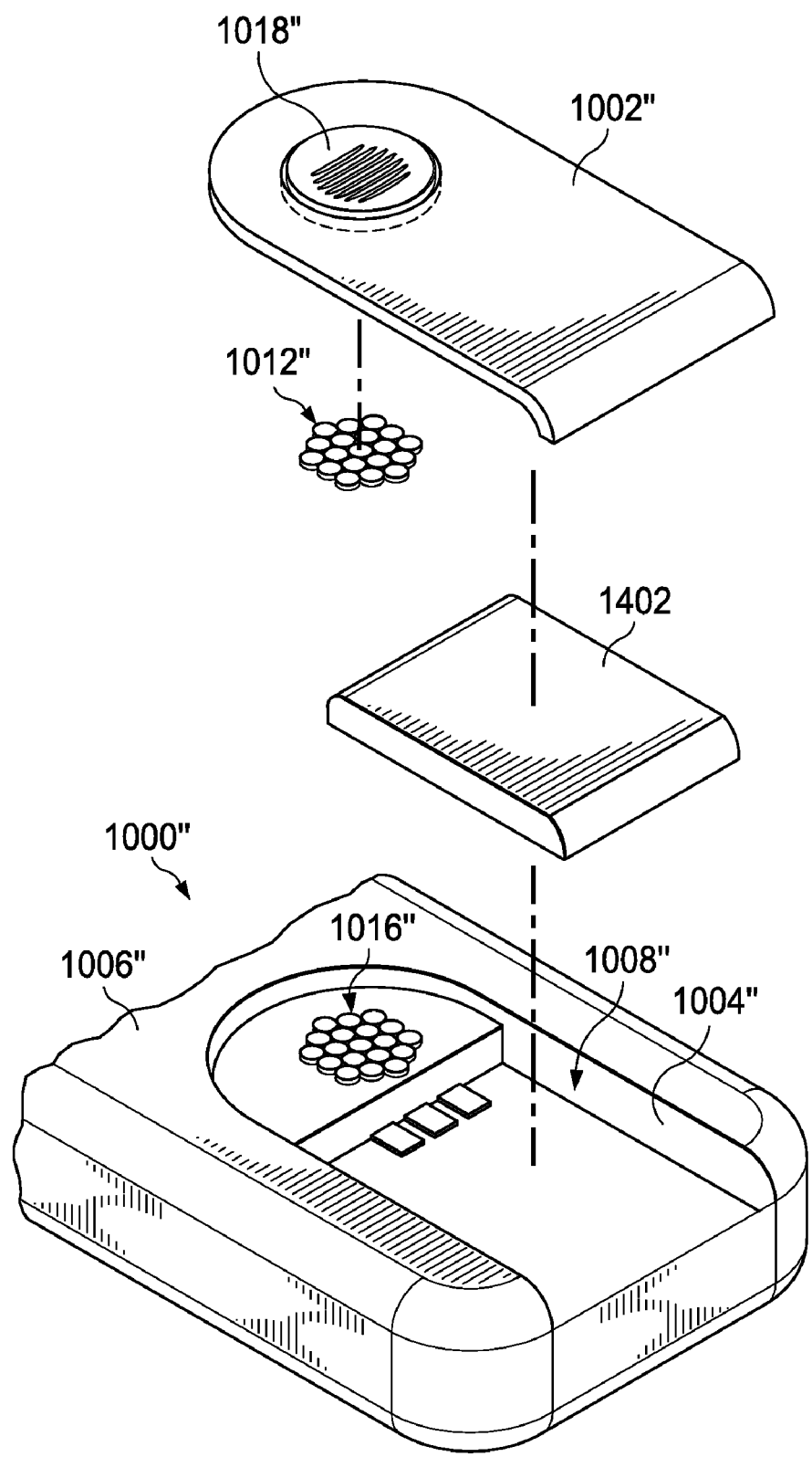
Figure 14D:
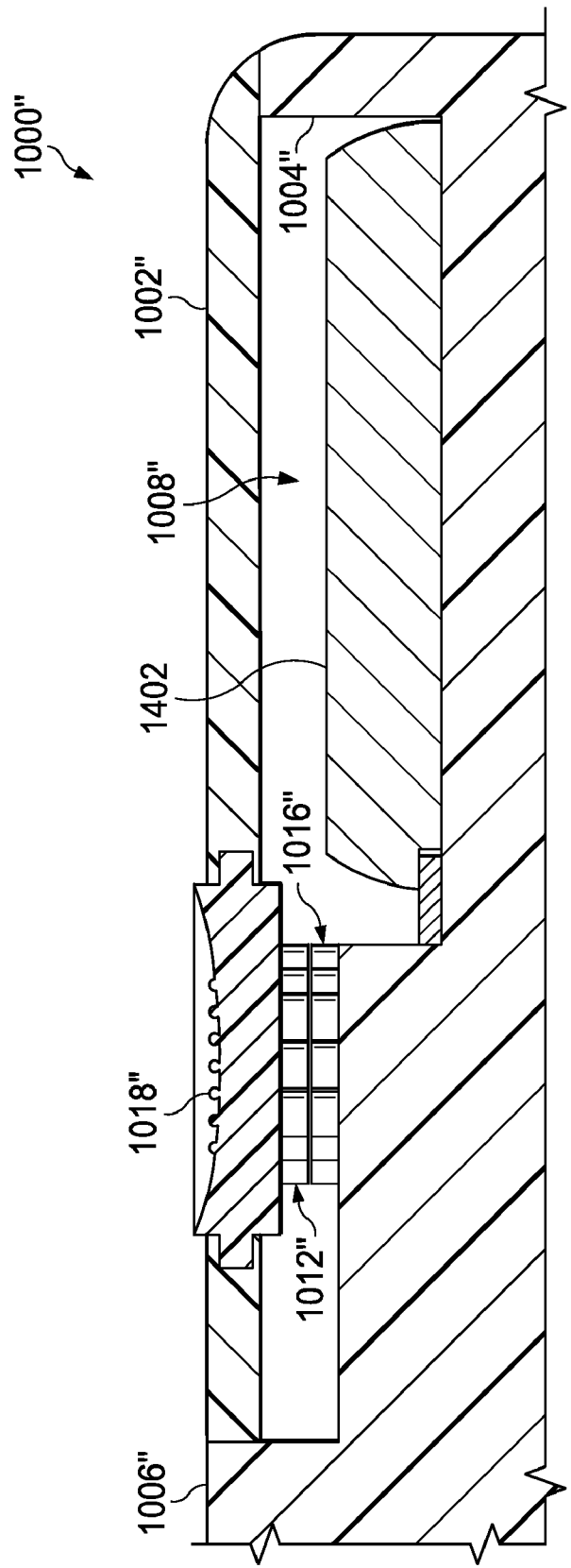

The cover 1002 is described above as having a release mechanism 1018 (e.g., turn-knob 1018) which is used to turn the first magnetic field emission structure 1012 relative to the mirror image second magnetic field emission structure 1016 such that the cover 1002 can be attached (secured) to or removed from the compartment 1004. FIGS. 12A-12C are several diagrams that illustrate an exemplary release mechanism 1018 (e.g., turn-knob 1018) in accordance with an embodiment of the present invention. In FIG. 12A, a portion of the surface 1010 of the cover 1002 from which the first magnetic field emission structure 1012 extends is shown along with a portion of the surface 1014 of the compartment 1004 supporting the second magnetic field emission structure 1016. The first magnetic field emission structure 1012 is physically secured to the release mechanism 1018. The release mechanism 1018 and the first magnetic field emission structure 1012 are also configured to turn about axis 1026 with respect to and within the cover 1002 allowing them to rotate such that the first magnetic field emission structure 1012 can be attached to and separated from the second magnetic field emission structure 1016 which enables the cover 1002 to be connected to and separated from the compartment 1004. Typically, the release mechanism 1018 and the first magnetic field emission structure 1016 would be turned by the user's hand. The release mechanism 1018 can also include at least one tab 1028 which is used to stop the movement of the first magnetic field emission structure 1012 relative to the second magnetic field emission structure 1016. In FIG. 12B, there is depicted a general concept of using the tab 1028 to limit the movement of the first magnetic field emission structure 1012 between two travel limiters 1030a and 1030b which protrude up from the cover 1002. The two travel limiters 1030a and 1030b might be any fixed object placed at desired locations on the cover 1002 where for instance they limit the turning radius of the release mechanism 1018 and the first magnetic field emission structure 1012. FIG. 12C depicts an alternative approach where the cover 1002 has a travel channel 1032 formed therein that is configured to enable the release mechanism 1018 (with a tab 1028) and the first magnetic field emission structure 1012 to turn about the axis 1026 where the travel limiters 1032a and 1032b limit the turning radius. For example, when the tab 1028 is stopped by travel limiter 1032a (or travel limiter 1030a) then the cover 1002 can be separated from the compartment 1004, and when the tab 1028 is stopped by travel limiter 1032b (or travel limiter 1030b) then the cover 1002 is secured to the compartment 1004. It should be appreciated that the release mechanism 1018 can have many different configurations instead of the turn-knob such as a flat surface with a groove size to fit a coin so the person can turn the first magnetic field emission structure 1012 or simply a depression in which a person can place their finger to turn the first magnetic field emission structure 1012.

In operation, the user could pick-up the cover 1002 which incorporates the first magnetic field emission structure 1012. The user would then move the cover 1002 towards the compartment 1004 which incorporates the second magnetic field emission structure 1016. Then, the user would align the first and second magnetic field emission structures 1012 and 1016 such that the cover 1002 can be attached to the compartment 1004 when the first and second magnetic field emission structures 1012 and 1016 are located next to one another and have a certain alignment with respect to one another where they correlate with each other to produce a peak attractive force. The user can release the cover 1002 from the compartment 1004 by turning the first magnetic field emission structure 1012 relative to the second magnetic field emission structure 1016 so as to misalign the two field emission structures 1012 and 1016. This process for attaching and detaching the cover 1002 to and from the compartment 1004 is possible because each of the first and second magnetic field emission structures 1012 and 1016 includes an array of field emission sources 1012a and 1016a each having positions and polarities relating to a desired spatial force function that corresponds to a relative alignment of the first and second magnetic field emission structures 1012 and 1016 within a field domain. Each field emission source of each array of field emission sources 1012a and 1016a has a corresponding field emission amplitude and vector direction determined in accordance with the desired spatial force function, where a separation distance between the first and second magnetic field emission structures 1012 and 1016 and the relative alignment of the first and second magnetic field emission structures 1012 and 1016 creates a spatial force in accordance with the desired spatial force function. The field domain corresponds to first field emissions from the array of first field emission sources 1012a of the first magnetic field emission structure 1012 interacting with second field emissions from the array of second field emission sources 1016a of the second magnetic field emission structure 1016.

Referring to FIGS. 13A-13D, there are several diagrams of an exemplary remote control unit 1000' that has a correlated magnetic cover 1002' (battery cover 1002') which can be easily and effectively attached to and removed from a correlated magnetic compartment 1004' (battery compartment 1004') in accordance with an embodiment of the present invention. The remote control unit 1000' has a body 1006' configured to receive the cover 1002' (incorporating the first field emission structure 1012') which can be attached to the compartment 1004' (incorporating the mirror image second field emission structure 1016') to enclose a space 1008' within the compartment 1004'. The cover 1002' when removed from the compartment 1004' provides access to the space 1008' (which typically contains batteries 1302) within the compartment 1004'. In this example, a release mechanism 1018' is shown and can be turned to align the first field emission structure 1012' and the second field emission structure 1016' to attach the cover 1002' to the compartment 1004' and the release mechanism 1018' can also be turned to misalign the first field emission structure 1012' and the second field emission structure 1016' to detach the cover 1002' from the compartment 1004'. The precise form of the remote control unit 1000' will not be discussed in detail herein since that is well-known in the art and the configuration and operation of the first and second field emission structures 1012' and 1016' are not discussed here since they have been discussed in detail above with respect to the exemplary device 1000.

Referring to FIGS. 14A-14D, there are several diagrams of an exemplary mobile phone 1000" that has a correlated magnetic cover 1002" (battery cover 1002") which can be easily and effectively attached to and removed from a correlated magnetic compartment 1004" (battery compartment 1004") in accordance with an embodiment of the present invention. The mobile phone 1000" has a body 1006" configured to receive the cover 1002" (incorporating the first field emission structure 1012") which can be attached to the compartment 1004" (incorporating the mirror image second field emission structure 1016") to enclose a space 1008" within the compartment 1004". The cover 1002" when removed from the compartment 1004" provides access to the space 1008" (which typically contains at least a battery 1402) within the compartment 1004". In this example, a release mechanism 1018" is shown and can be turned to align the first field emission structure 1012" and the second field emission structure 1016" to attach the cover 1002" to the compartment 1004" and the release mechanism 1018" can also be turned to misalign the first field emission structure 1012" and the second field emission structure 1016" to detach the cover 1002" from the compartment 1004". The precise form of the mobile phone 1000" will not be discussed in detail herein since that is well-known in the art and the configuration and operation of the first and second field emission structures 1012" and 1016" are not discussed here since they have been discussed in detail above with respect to the exemplary device 1000.

Figure 15B:
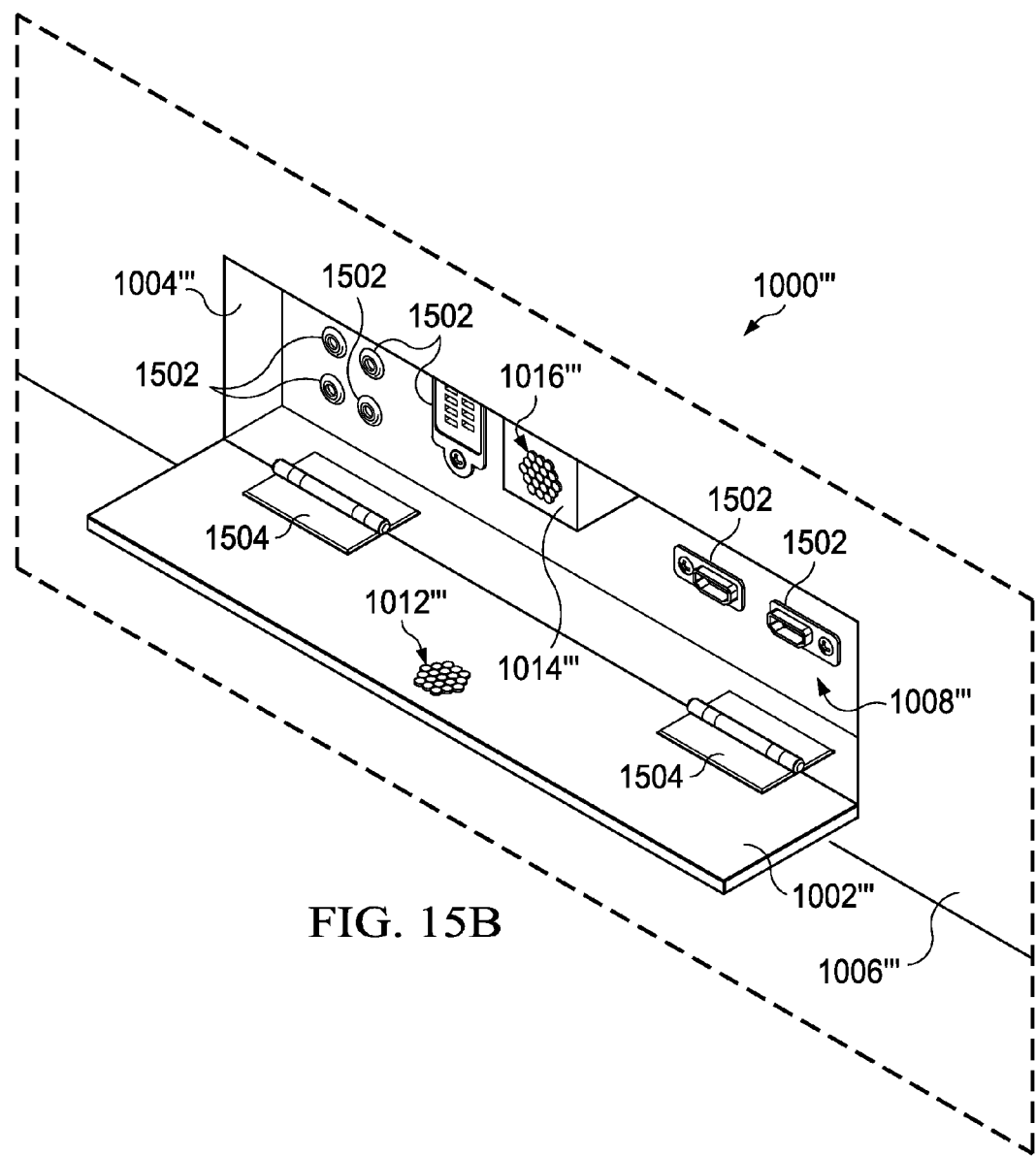

Referring to FIGS. 15A-15B, there are several diagrams of an exemplary television 1000''' that has a correlated magnetic cover 1002''' which can be easily and effectively attached to and removed from a correlated magnetic compartment 1004''' in accordance with an embodiment of the present invention. The television 1000''' has a body 1006''' with the cover 1002''' (incorporating the first field emission structure 1012''' and release mechanism 1018''') that can be attached to the compartment 1004''' (incorporating the mirror image second field emission structure 1016''') to enclose a space 1008''' within the compartment 1004'''. The cover 1002''' when removed from the compartment 1004''' provides access to the space 1008''' (which typically contains various component connectors 1502) within the compartment 1004'''. In this example, the cover 1002''' rotates on two hinges 1504 when it is removed from the compartment 1004''' to provide access to the space 1008'''. In this example, a release mechanism 1018''' is shown and can be turned to align the first field emission structure 1012''' and the second field emission structure 1016''' to attach the cover 1002''' to the compartment 1004''' and the release mechanism 1018''' can also be turned to misalign the first field emission structure 1012''' and the second field emission structure 1016''' to detach the cover 1002''' from the compartment 1004'''. The precise form of the television 1000''' will not be discussed in detail herein since that is well-known in the art and the configuration and operation of the first and second field emission structures 1012''' and 1016''' are not discussed here since they have been discussed in detail above with respect to the exemplary device 1000. As can be appreciated, the device 1000 of the present invention could include a wide-variety of components such as, for example, the remote control unit 1000', the mobile phone 1000", the television 1000''', a calculator, a clock-radio, a laptop computer, a PDA, a camera, a portable media player, and a handheld electronic game unit. Generally, the invention can be used for any device that has a compartment and a removable cover or a hinged cover. In addition, it should be appreciated that the device 1000 and in particular the cover 1002 and the compartment 1004 could have a series of field emission sources (mirror images of one another) positioned around at least a portion of their perimeters instead of having the array of field emission sources described above. In this case, the person when removing the cover 1002 from the compartment 1004 would have to apply a pull force, shear force, or any other force sufficient to overcome the attractive peak spatial force between the substantially aligned field emission sources.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A device comprising:
  a cover including a first field emission structure; and
  a compartment including a second field emission structure, where the cover is attached to the compartment to enclose a space within the compartment when the first and second field emission structures are located next to one another and have a certain alignment with respect to one another, where each of the first and second field emission structures include field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

2. The device of claim 1, wherein the cover is released from the compartment to provide access to the space within the compartment when the first and second field emission structures are turned with respect to one another.

3. The device of claim 1, wherein the cover further includes a release mechanism which is used to turn the first field emission structure with respect to the second field emission structure to release the cover from the compartment and provide access to the space within the compartment.

4. The device of claim 1, wherein the space within the compartment is configured to contain one or more batteries.

5. The device of claim 1, wherein the space within the compartment is configured to contain one or more component connectors.

6. The device of claim 1, wherein the cover and the compartment each has incorporated therein one or more additional field emission structures.

7. The device of claim 1, wherein said positions and said polarities of each of said field emission sources are determined in accordance with at least one correlation function.

8. The device of claim 7, wherein said at least one correlation function is in accordance with at least one code.

9. The device of claim 8, wherein said at least one code is at least one of a pseudorandom code, a deterministic code, or a designed code.

10. The device of claim 8, wherein said at least one code is one of a one dimensional code, a two dimensional code, a three dimensional code, or a four dimensional code.

11. The device of claim 1, wherein each of said field emission sources has a corresponding field emission amplitude and vector direction determined in accordance with the desired spatial force function, wherein a separation distance between the first and second field emission structures and the relative alignment of the first and second field emission structures creates a spatial force in accordance with the desired spatial force function.

12. The device of claim 11, wherein said spatial force include at least one of an attractive spatial force or a repellant spatial force.

13. The device of claim 11, wherein said spatial force corresponds to a peak spatial force of said desired spatial force function when said first and second field emission structures are substantially aligned such that each field emission source of said first field emission structure substantially aligns with a corresponding field emission source of said second field emission structure.

14. The device of claim 1, wherein said field domain corresponds to first field emissions from said field emission sources of said first field emission structure interacting with second field emissions from said second field emission sources of said second field emission structure.

15. The device of claim 1, wherein said polarities of the field emission sources include at least one of North-South polarities or positive-negative polarities.

16. The device of claim 1, wherein at least one of said field emission sources includes a magnetic field emission source or an electric field emission source.

17. The device of claim 1, wherein at least one of said field emission sources include a permanent magnet, an electromagnet, an electret, a magnetized ferromagnetic material, a portion of a magnetized ferromagnetic material, a soft magnetic material, or a superconductive magnetic material.

18. A method for enabling a cover to be attached to and removed from a compartment within a device, said method comprising the steps of:
   attaching a first field emission structure to the cover;
   attaching a second field emission structure to the compartment; and
   aligning the first and second field emission structures so the cover attaches to the compartment and encloses a space within the compartment when the first and second field emission structures are located next to one another and have a certain alignment with respect to one another, where each of the first and second field emission structures include field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

19. The method of claim 18, further comprising a step of turning the first emission structure with respect to the second field emission structure to remove the cover from the compartment.

20. The method of claim 18, wherein the device includes a remote control and the space within the compartment is configured to contain one or more batteries.

* * * * *